United States Patent [19]

Tabata et al.

[11] Patent Number: 4,919,400

[45] Date of Patent: Apr. 24, 1990

[54] VIBRATION ISOLATOR OF BUSHING TYPE WITH LIQUID CHAMBERS AN ELASTIC BODY

[75] Inventors: Toshiyuki Tabata, Sagamihara; Tatsuro Ishiyama, Yokohama, both of Japan

[73] Assignees: Nissan Motor Co., Ltd., Yokohama; Bridgestone Corporation, Tokyo, both of Japan

[21] Appl. No.: 296,018

[22] Filed: Jan. 12, 1989

[30] Foreign Application Priority Data

Jan. 12, 1988 [JP] Japan ................................. 63-4374

[51] Int. Cl.⁵ ............................................. F16F 13/00
[52] U.S. Cl. ............................ 267/140.1; 267/141.2; 267/219
[58] Field of Search .................. 267/140.1, 141.2, 219, 267/220, 35, 141.3–141.7, 140.2, 140.3, 140.5; 180/312, 300, 902; 248/562, 636, 550, 638; 123/192 R, 195 R

[56] References Cited

U.S. PATENT DOCUMENTS

| | | | |
|---|---|---|---|
| 4,630,806 | 12/1986 | Dan et al. ........................ | 267/140.1 |
| 4,690,389 | 9/1987 | West ................................. | 267/140.1 |
| 4,693,456 | 9/1987 | Kanda .............................. | 267/140.1 |
| 4,702,346 | 10/1987 | Uno et al. ...................... | 267/140.1 X |
| 4,728,086 | 3/1988 | Ishiyama et al. .............. | 267/141.2 X |
| 4,749,173 | 6/1988 | Kanda et al. ................... | 267/140.1 |
| 4,749,174 | 6/1988 | Kanda .............................. | 267/140.1 |
| 4,756,514 | 7/1988 | Kanda .............................. | 267/140.1 |
| 4,768,760 | 9/1988 | LeFol .............................. | 267/140.1 |
| 4,790,520 | 12/1988 | Tanaka et al. .................. | 248/562 X |
| 4,834,351 | 5/1989 | Freudenberg et al. ......... | 267/140.1 |

FOREIGN PATENT DOCUMENTS

| | | | |
|---|---|---|---|
| 3722079 | 1/1988 | Fed. Rep. of Germany ...... | 248/562 |
| 0157849 | 7/1986 | Japan ................................. | 267/140.1 |
| 62-118133 | 5/1987 | Japan . | |
| 0224745 | 10/1987 | Japan ................................. | 267/140.1 |
| 0224746 | 10/1987 | Japan ................................. | 267/140.1 |

Primary Examiner—Douglas C. Butler
Attorney, Agent, or Firm—Lowe, Price, LeBlanc, Becker & Shur

[57] ABSTRACT

The invention provides an improved vibration isolator for use, for example, in an automotive engine mounting. The vibration isolator has a hollow outer cylinder and an inner cylinder disposed in and parallel to the outer cylinder. One of the two cylinders is to be connected with a member that vibrates and the other with another member to be isolated from vibration. An elastic body tightly interposed between the outer and inner cylinders is formed with a hollow so that tensile force may not act on this body. Opposite to the hollow with respect to the inner cylinder the elastic body is formed with radially inner and outer liquid chambers which are connected to each other by a flow restrictive passage. An elastic membrane is attached to the inner surface of the outer cylinder, and a part of the membrane serves as a flexible diaphragm defining the radially outer periphery of the outer liquid chamber. In a region where the elastic membrane is used as the diaphragm, the cylindrical wall of the outer cylinder is formed with an opening to expose the diaphragm to the atmosphere. This vibration isolator can be easily and accurately assembled in the liquid to be filled into the liquid chambers without the need for any extra operation for extracting unneeded liquid from any other space or chamber in the assembled device.

5 Claims, 4 Drawing Sheets

VIBRATION ISOLATOR OF BUSHING TYPE WITH LIQUID CHAMBERS AN ELASTIC BODY

FIELD OF THE INVENTION

This invention relates to a vibration isolating device of a bushing type using an elastic body interposed between a hollow outer cylinder and an inner cylinder and an incompressible liquid filled into two chambers formed in the elastic body.

BACKGROUND OF THE PRIOR ART

Vibration isolators of the above-mentioned type are used in automobiles and other vehicles for engine mounting, cab mounting, body mounting, and so on. More particularly, the outer and inner cylinders are disposed in a parallel arrangement, and one of the two cylinders is connected with a member that vibrates and the other cylinder connects with another member to be isolated from vibration. The two liquid chambers are connected to each other by a flow restrictive passage, and at least one of the liquid chambers is partly defined by a flexible diaphragm. For example, JP-A No. 62-118133 shows a vibration isolator of this type. In such a vibration isolator, vibration is damped by elastic deformtion of the elastic body and movement of the liquid through the flow restrictive passage caused by deformation of the liquid chambers.

In Japanese Patent Application No. 62-152609 filed June 19, 1987 (not our published yet) and corresponding U.S. patent application Ser. No. 206,718 filed June 15, 1988, there is taught the provision of a hollow in the elastic body of a vibration isolator of the abovedescribed bushing type to prevent cracking or deterioration of the elastic body by the action of tensile force thereon. The hollow is located opposite to the liquid chambers with respect to the inner cylinder and extends over the entire length of the elastic body.

In a vibration isolator disclosed in the aforementioned patent applications, two liquid chambers are formed by scooping out the elastic body to provide a hollow opening in the cylindrical outer surface of the body and inserting a partition plate to divide the hollow into a radially inner chamber and a radially outer chamber. A hollow intermediate cylinder is fitted around the elastic body and is formed with an opening in a region facing the outer liquid chamber. A tubular elastic membrane is tightly inserted between the outer cylinder and the intermediate cylinder, and the tubular membrane is dented radially inward in a region where the intermediate cylinder is formed with the opening such that the dented part of the tubular membrane defines the radially outer periphery of the outer liquid chamber. The outer cylinder has a small hole in a section covering the opening in the intermediate cylinder so that the space between the outer cylinder and the dented part of the tubular elastic membrane becomes an air chamber communicating with the atmosphere. This vibration isolator is assembled in a liquid to be filled into the liquid chambers. The elastic body formed in advance with the hollows bonded to the inner cylinder and the intermediate cylinder by vulcanization or curing. In the liquid, the tubular elastic membrane is fitted around the intermediate cylinder, and then the outer cylinder is fitted around and fixed by crimping to the intermediate cylinder. In the operations in the liquid it is not easy to accurately position the locally dented tubular membrane with respect to the opening in the wall of the intermediate cylinder, and, after that, it is difficult to completely extract the liquid from the aforementioned space to be made the air chamber by using the small hole in the outer cylinder.

SUMMARY OF THE INVENTION

It is an object of the present invention to provide an improved vibration isolating device of the above-described bushing type, which is good in performance and durability and can easily and accurately be assembled.

According to a preferred embodiment of the invention there is provided a vibration isolating device comprising a hollow outer cylinder formed with an opening in its cylindrical wall, an inner cylinder which has an outer diameter smaller than the inner diameter of the outer cylinder and is disposed inside and parallel to the outer cylinder, an elastic body which is tightly interposed between the outer and inner cylinders and is formed with a hollow on one side of a plane containing the longitudinal axis of the inner cylinder and a radially inner first liquid chamber and a radially outer second liquid chamber on the opposite side of said plane, means for defining a flow restrictive passage which connects the first and second liquid chambers to each other, an elastic membrane which is tightly attached to the inner surface of the outer cylinder and partly serves as a flexible diaphragm defining the radially outer periphery of the second liquid chamber, the cylindrical wall of the outer cylinder being formed with an opening in a region where the elastic membrane serves as said diaphragm, and an incompressible liquid filled into the first and second liquid chambers and the flow restrictive passage. One of the outer and inner cylinders is to be connected with a member which vibrates and the other with another member which is to be isolated from vibration.

In this vibration isolator, the hollow in the elastic body is effective for prevention of tensile force acting on the elastic body and thereby prevents cracking or deterioration of the elastic body. Furthermore, this device can be easily and accurately assembled in the liquid to be filled into the liquid chambers, without need of any extra operation to remove the liquid from any space or chamber in the assembled device, by virtue of the attachment of the elastic membrane to the outer cylinder and the provision of the opening in the wall of the outer cylinder in the region where the elastic membrane is used as the diaphragm defining the second liquid chamber.

DESCRIPTION OF THE PREFERRED EMBODIMENTS

Figure 1:
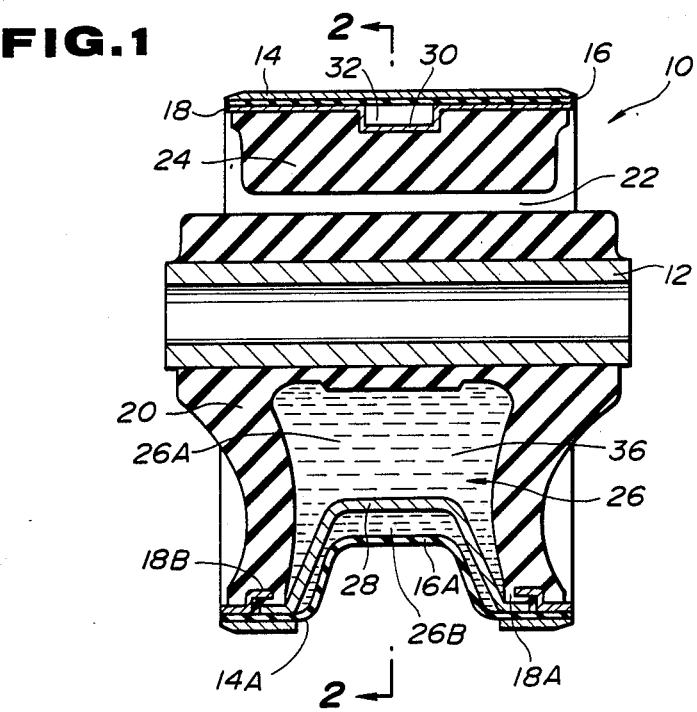
FIG. 1 is a longitudinal sectional view of a vibration isolating device according to a preferred embodiment of the invention, taken along the line 1—1 in FIG. 2.
Figure 2:
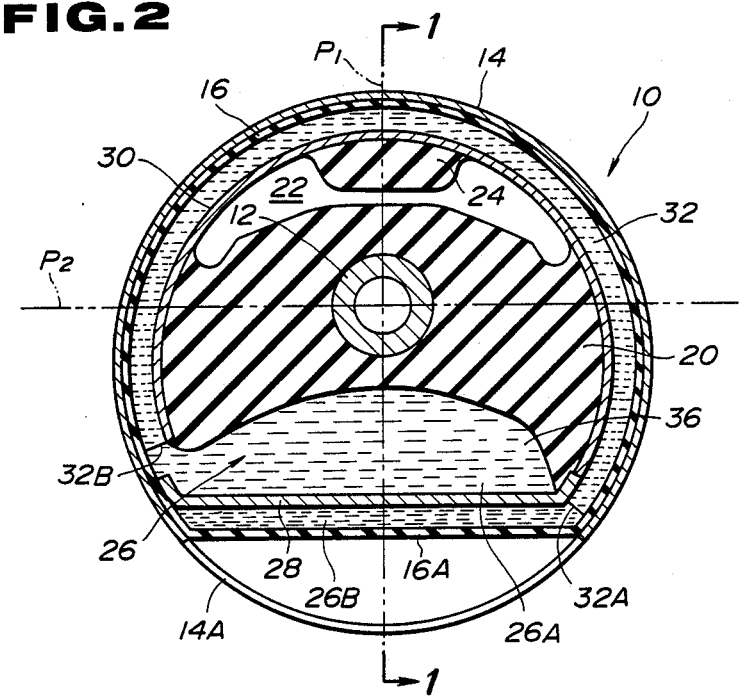
FIG. 2 is a cross-sectional view of the device of FIG. 1, taken along the line 2—2 in FIG. 1.
Figure 3:
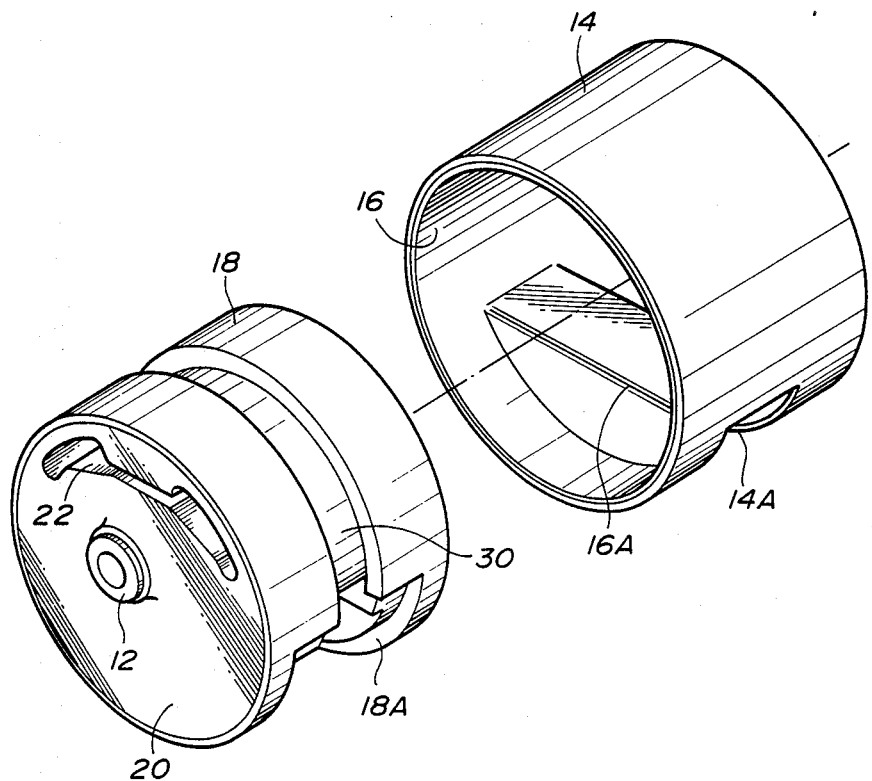
FIG. 3 is an exploded perspective view of the device of FIGS. 1 and 2.
Figure 3:
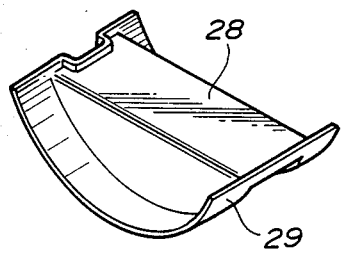

A preferred embodiment of the present invention, best seen in FIGS. 1 to 3, has a vibration isolator 10 in a form suitable for use as a part of engine mounting in an automobile. The vibration isolator 10 has an inner cylinder 12 to be connected to the automotive engine and an outer cylinder 14 to be fitted into brackets (not shown) fixed to a member of the car body. The inner diameter of the outer cylinder 14 is larger than the outer diameter of the inner cylinder 12. The longitudinal axis of the outer cylinder 14 is parallel to the longitudinal axis of the inner cylinder 12, though the two cylinders 12, 14 are not necessarily coaxial. These two cylinders 12, 14 are metal cylinders.

The inner surface of the outer cylinder 14 is covered with a tubular elastic membrane 16. Preferably the elastic membrane 16 is bonded to the surface of the cylinder 14 by vulcanization or curing. An intermediate cylinder 18, which is also a metal cylinder, is fitted into the outer cylinder 14 lined with the elastic membrane 16. The inner diameter of this cylinder 18 is larger than the outer diameter of the inner cylinder 12.

A major part of the space between the inner cylinder 12 and the intermediate cylinder 18 is filled up with an elastic body 20 formed of a rubber or the like. The elastic body 20 tightly covers and adheres to the outer surface of the inner cylinder 12 and, at its radially outer periphery, adheres to the inner surface of the intermediate cylinder 18. The elastic body 20 is scooped out over its entire length so as to provide a hollow 22. In any cross-section of the vibration isolator 10 the hollow 22 intersects a plane $P_1$ containing both the axis of the inner cylinder 12 and the axis of the outer cylinder 14 and is substantially symmetrical with respect to this plane $P_1$, but does not intersect a plane $P_2$ which contains the axis of the inner cylinder 12 and is perpendicular to the plane $P_1$. The hollow 22 modulates the elasticity of and permits elastic deformation of the elastic body 20 so that tensile force may not act on the elastic body 20 when a load of the engine is transmitted thereto via the inner cylinder 12. To narrow a middle section of the hollow 22, a fraction 24 of the elastic body 20 protrudes radially inward from the inner surface of the intermediate cylinder 18. Alternatively, this protuberance 24 may be a separate member of an elastic material such as rubber. The protuberance 24 serves as a stopper to limit the amount of relative movement between the inner and outer cylinders 12 and 14.

On the side of the aforementioned plane $P_2$ that is opposite to hollow 22, there is provided a liquid chamber 26 formed by hollowing out the elastic body 20 from its radially outer surface so as not expose the inner cylinder 12. Actually, the elastic body 20 is molded with a hollow to be used as the liquid chamber 26 by inserting a core corresponding in shape and size to the desired hollow into the mold. Lengthwise of the vibration isolator 10, the liquid chamber 26 is shorter than the outer cylinder 14 and than the elastic body 20, so that in the both end sections of the outer cylinder 14 the elastic body 20 remains extending from the inner cylinder 12 to the intermediate cylinder 18. As will be described hereinafter, an incompressible liquid 36 such as water or oil is filled into the liquid chamber 26.

In a region corresponding to the liquid chamber 26, as best seen in FIG. 3, the intermediate cylinder 18 is cut out to provide an opening 18A. In the same region, the tubular elastic membrane 16 is dented into the liquid chamber 26 such that a dented part 16A of the membrane 16 serves as a flexible diaphragm which defines the radially outer end of the liquid chamber 26. In the same region the outer cylinder 14 is cut out to provide an opening 14A. Therefore, the outer surface of the diaphragm 16A is exposed.

A partition plate 28 shaped correspondingly to the diaphragm 16A is fixedly inserted into the liquid chamber 26 to divide the chamber 26 into a first liquid chamber 26A, which is a radially inner chamber, and a second liquid chamber 26B which is a radially outer chamber defined between the partition plate 28 and the diaphragm 16A. As shown in FIG. 3, the partition plate 28 is a part of a metal member 29 having nearly semicylindrical edges of the metal member 29 are tightly inserted between the elastic body 20 and the elastic membrane 16. As shown in FIG. 1, along the longitudinal ends of the opening 18A the intermediate cylinder 18 is folded so as to form sectionally L-shaped shoulder portions 18B for limiting the amount of movement of the inserted member 29 toward the inner cylinder 12.

The intermediate cylinder 18 is formed with a cross-sectionally C-shaped dent 30 which is opposite to the aforementioned opening 18A with respect to the inner cylinder 12. Therefore, a cross-sectionally C-shaped flow restrictive passage 32 is formed between the inner surface of the elastic membrane 16 and the outer surface of the dented region 30 of the intermediate cylinder 18, a portion 1830 of the intermediate cylinder 18 extending toward and connecting with the dented region 30. One end 32A of this passage 32 opens in the second liquid chamber 26B and the other end 32B in the first liquid chamber 26A.

Figure 4:
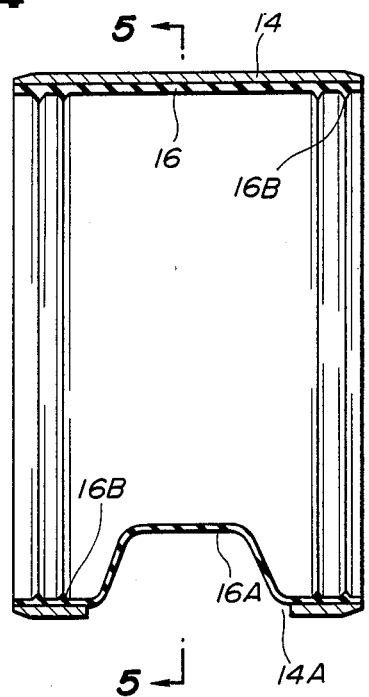
FIG. 4 is a longitudinal sectional view of the outer cylinder of the device of FIGS. 1 to 3, taken along the line 4—4 in FIG. 5.
Figure 5:
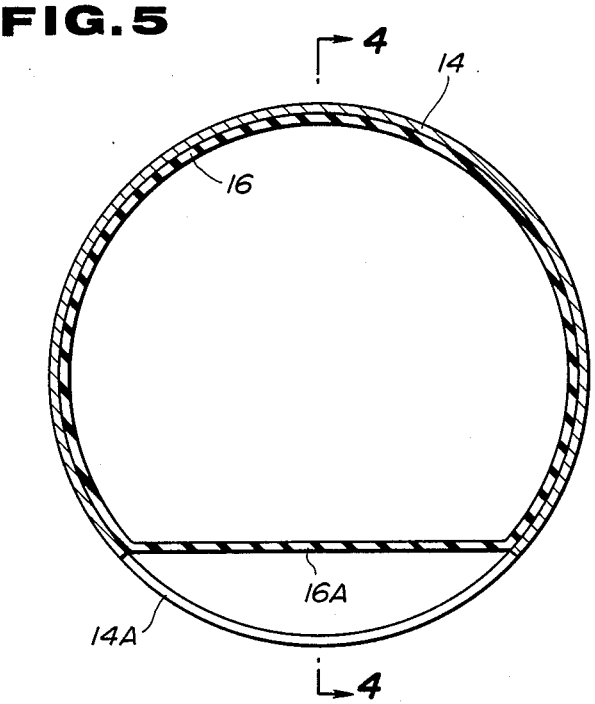
FIG. 5 is a cross-sectional view taken along the line 5—5 in FIG. 4.

As shown in FIG. 4, in end sections of the tubular elastic membrane 16 on both sides of the dent 16A, annular protuberances 16B are formed on the inner surface of the tubular membrane 16. These annular protuberances 16B serve the purpose of augmenting the airtight sealing between the elastic membrane 16 and the outer surface of the intermediate cylinder 18.

In assembling the vibration isolator 10, the inner cylinder 12, the intermediate cylinder 18 and the elastic body 20 are united into a main body by vulcanizing or curing the elastic body 20 so as to tightly adhere to the two cylinders 12 and 18. As described above, the elastic body 20 is formed with the hollow 22 and another hollow for use as the liquid chamber 26. The metal member 29 having the partition plate 28 is fitted into the hollowed elastic body 20. Separately, the tubular elastic membrane 16 is inserted into the outer cylinder 14 and vulcanized or cured to tightly adhere to the inner surface of the cylinder 14. The outer cylinder 14 is formed with the opening 14A, and the tubular membrane 16 is formed with the dent 16A in the corresponding region. Therefore, the dented region 16A of the membrane is free of the outer cylinder 14.

Next, in a liquid to be filled into the liquid chambers 26, the main body (assembly of inner cylinder 12, intermediate cylinder 18, elastic body 20 and metal member 29) is fitted into the outer cylinder 14 lined with the elastic membrane 16. Naturally, the liquid chambers 26A, 26B and the flow restricting passage 32 are filled with the liquid. For easing this operation the inner diameter of the tubular elastic membrane 16 is made larger than the outer diameter of the intermediate cylinder 18 by about 2 mm. Since the tubular membrane 16 is firmly adhering to the outer cylinder 14 it is easy to bring the dent 16A into the proper position with respect to the hollow 26 in the main body by turning and axially moving the outer cylinder 14. Then, still in the liquid, the outer cylinder 14 is radially contricted to accomplish tight contact of the elastic membrane 16 with the intermediate cylinder 18. by this working, the assemblage of the vibration isolator 10 is completed. When the vibration isolator 10 is taken out of the liquid, the liquid in the dent 16A of the cylindrical outer periphery soon drains away through the opening 14A of the outer cylinder 14. That is, without the need for any extra operation of the liquid does not remain between the outer cylinder 14 and the dented region 16A of the tubular membrane 16.

In the thus constructed vibration isolator 10 the opening 14A in the wall of the outer cylinder 14 is accurately in position with respect to the dent 16A of the tubular elastic membrane 16, and the dent 16A is accurately positioned with respect to the liquid chamber 26B. Therefore there is no possibility of local choking of the flow restrictive passage 32 or leakage of the liquid 36 from the liquid chambers 26A, 26B.

Figure 6:
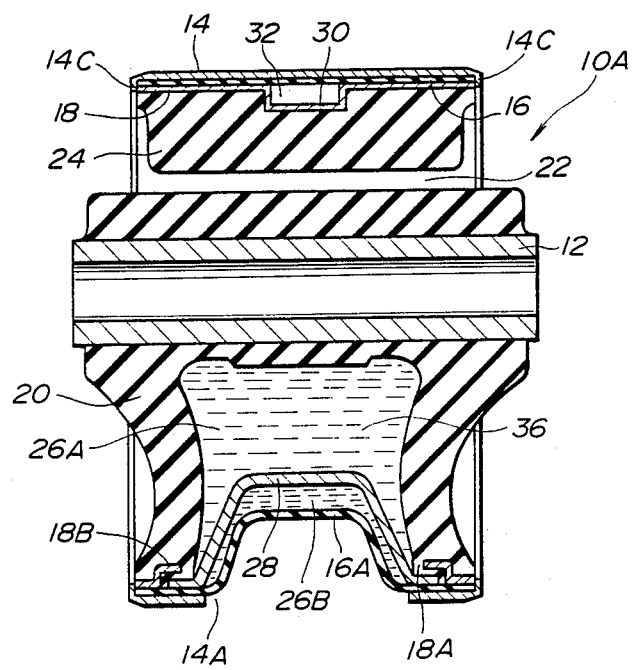
FIG. 6 is is a longitudinal sectional view of another vibration isolating device which is another embodiment of the device of FIGS. 1 to 3.

FIG. 6 shows another vibration isolator 10A embodying the invention in a longitudinal sectional view corresponding to FIG. 1. This vibration isolator 10A is almost identical with the vibration isolator 10 of FIGS. 1–3 and differs only in that the outer cylinder 14 is slightly extended lengthwise and that each end section 14C of the outer cylinder 14 is crimped radially inward, whereby the outer cylinder 14 is very securely fixed to the intermediate cylinder 18.

What is claimed is:

1. A vibration isolating device, comprising:
    a hollow outer cylinder;
    an inner cylinder which has an outer diameter smaller than the inner diameter of the outer cylinder and is disposed in and parallel to the outer cylinder, one of the outer and inner cylinders being formed to be connected with a member which vibrates and the other cylinder being formed to be connected with another membrane which is to be isolated from vibration;
    an elastic body which is tightly interposed between the outer and inner cylinders and is formed with a hollow on one side of a plane containing the longitudinal axis of the inner cylinder and a radially inner first liquid chamber and a radially outer second liquid chamber on the opposite side of said plane;
    means for defining a flow restrictive passage which connects said first and second liquid chambers to each other;
    a tubular elastic membrane which is tightly bonded by vulcanization to the inner surface of said outer cylinder and partly has a radially inwardly dented part such that the dented part serves as a flexible diaphragm defining the radially outer periphery of said second liquid chamber, the cylindrical wall of said outer cylinder being formed with an opening in a region where said elastic membrane is used as said diaphragm such that said opening occupies an area opposite to the entire area of said dented part of said tubular elastic membrane; and
    an incompressible liquid filled into said first and second liquid chambers and said flow restrictive passage.

2. A device according to claim 1, wherein:
    said first and second liquid chambers are adjoining chambers bordered by a partition plate inserted into another hollow in said elastic body.

3. A device according to claim 1 wherein:
    said means for defining the flow restrictive passage comprises a hollow intermediate cylinder which is disposed between the inner and outer cylinders and between the tubular elastic membrane and said elastic body, and is locally dented radially inward such that a cross-sectionally C-shaped passage opening at its one end in said first liquid chamber and at the other end in said second liquid chamber is provided between said elastic membrane and the outer surface of said intermediate cylinder, said intermediate cylinder being formed with an opening in a region corresponding to said opening of said outer cylinder.

4. A vibration isolating device, comprising:
    a hollow outer cylinder;
    an inner cylinder which has an outer diameter smaller than the inner diameter of the outer cylinder and is disposed in and parallel to the outer cylinder, one of the outer and inner cylinders being formed to be connected with a member which vibrates and the other cylinder being formed to be connected with another member which is to be isolated from vibration;
    a cylindrical elastic body which is tightly interposed between the outer and inner cylinders and is formed with an internal hollow on one side of a plane containing the longitudinal axis of the inner cylinder and a recess in a longitudinally intermediate section on the opposite side of said plane, said hollow being formed so as to permit elastic deformation of said elastic body and thereby relieve said elastic body from tensile force acting thereon via either of said outer and inner cylinders and extending axially of and over the entire length of the elastic body;
    a stopper element which is united with said elastic body and protrudes into said hollow so as to limit the amount of radial deformation of said elastic body;
    a partition plate inserted into said recess such that said recess is divided into a radially inner first liquid chamber and a radially outer second liquid chamber;
    means for defining a flow restrictive passage which extends around a part of the outer circumference of said elastic body to connect said first and second liquid chambers with each other;
    a tubular elastic membrane which is tightly bonded by vulcanization to the inner surface of said outer cylinder and has a radially inwardly dented part such that the dented part serves as a flexible diaphragm defining the radially outer periphery of said second liquid chamber, the cylindrical wall of said outer cylinder being formed with an opening in a region where said elastic membrane is dented such that said opening occupies an area opposite to the whole area of said dented part of said elastic membrane; and
    an incompressible liquid filled into said first and second liquid chambers and said flow restrictive passage.

5. A vibration isolating device, comprising:
    a hollow outer cylinder;

an inner cylinder which has an outer diameter smaller than the inner diameter of the outer cylinder and is disposed in and parallel to the outer cylinder, one of the outer and inner cylinders being formed to be connected with a member which vibrates and the other cylinder being formed to be connected with another member which is to be isolated from vibration;

a cylindrical elastic body which is tightly interposed between the outer and inner cylinders and is formed with an internal hollow on one side of a plane containing the longitudinal axis of the inner cylinder and a recess in a longitudinaly intermediate section on the opposite side of said plane, said hollow being formed so as to permit elastic deformation of said elastic body and thereby relieve said elastic body from tensile force acting thereon via either of said outer and inner cylinders and extending axially of and over the entire length of the elastic body;

a partition plate inserted into said recess such that said recess is divided into a radially inner first liquid chamber and a radially outer second liquid chamber;

means for defining a flow restrictive passage which extends around a part of the outer circumference of said elastic body to connect said first and second liquid chambers with each other;

a tubular elastic membrane which is tightly bonded by vulcanization to the inner surface of said outer cylinder and has a radially inwardly dented part such that the dented part serves as a flexible diaphragm defining the radially outer periphery of said second liquid chamber, the cylindrical wall of said outer cylinder being formed with an opening in a region where said elastic membrane is dented such that said opening occupies an area opposite to the whole area of said dented part of said elastic membrane; and an incompressible liquid filled into said first and second liquid chambers and said flow restrictive passage.

* * * * *